United States Patent [19]
Engdahl et al.

[11] Patent Number: 6,074,521
[45] Date of Patent: Jun. 13, 2000

[54] METHOD OF SEPARATING IMPURITIES FROM LIME AND LIME SLUDGE

[75] Inventors: Holgor Engdahl; Jouni Jantti, both of Savonlinna; Kurt Siren, Espoo; Juhani Vehmaan-Kreula; Pasi Vanttinen, both of Savonlinna, all of Finland

[73] Assignee: Ahlstrom Machinery Oy, Helsinki, Finland

[21] Appl. No.: 08/981,642

[22] PCT Filed: Jul. 10, 1996

[86] PCT No.: PCT/FI96/00406

§ 371 Date: Jan. 9, 1998

§ 102(e) Date: Jan. 9, 1998

[87] PCT Pub. No.: WO97/03245

PCT Pub. Date: Jan. 30, 1997

[30] Foreign Application Priority Data

Jul. 11, 1995 [FI] Finland ..................................... 953402
May 31, 1996 [FI] Finland ..................................... 962289

[51] Int. Cl.[7] .................................................. D21C 11/00
[52] U.S. Cl. ........................... 162/29; 162/30.1; 423/637; 423/640
[58] Field of Search ................................ 162/30.11, 30.1, 162/29, 47; 423/195, DIG. 3, 242.1, 637, 640

[56] References Cited

U.S. PATENT DOCUMENTS 4,302,281  11/1981  Ryham ................................. 162/301 C
5,607,548   3/1997  Pettersson .............................. 162/30.11
5,607,549   3/1997  Koskiniemi ........................... 162/30.11

FOREIGN PATENT DOCUMENTS

1184006    3/1985  Canada .
523485     5/1931  Germany .
139502     3/1953  Sweden .
WO 85/01966 5/1985  WIPO .

Primary Examiner—Dean T. Nguyen
Attorney, Agent, or Firm—Nixon & Vanderhye P.C.

[57] ABSTRACT

A method of separating impurities from lime or the calcium carbonate or the lime sludge produced in the chemical recovery system of a pulp mill so that lime sludge or lime is dissolved in a solution containing carbonate or hydrocarbonate in order to dissolve impurities. Subsequently the lime sludge or lime is separated from the solution containing dissolved impurities. A method of causticizing green liquor containing impurities, such as silicon, in two stages. In the first stage green liquor is causticized with such an amount of lime that impurities substantially remain in the liquor. The lime produced in this stage is removed from the liquor and the rest of the lime required in the causticizing is added to this liquor, so that impurities precipitate with the lime sludge produced in the second stage and at least a portion of the lime sludge rich in impurities is discharged from the process.

19 Claims, 10 Drawing Sheets

METHOD OF SEPARATING IMPURITIES FROM LIME AND LIME SLUDGE

CROSS REFERENCE TO RELATED APPLICATION

This is a U.S. national phase of PCT/FI96/00406 filed Jul. 10, 1996.

BACKGROUND AND SUMMARY OF THE INVENTION

The invention relates to a method of separating impurities in connection with the chemical recovery system of a pulp mill, in particular from the calcium-containing substances used therein, which are mainly lime sludge and lime, and from its liquor circulation.

The term impurities is used in the present patent application to denote various detrimental substances such as silicon, phosphor, vanadium, sulphur, etc., which may also be called non-process elements, building up in the chemical circulation of a pulp manufacture process and originating from various raw material sources. Sources of impurities are mainly wood raw material (phosphor), make-up lime (silicon) and combustion oil (vanadium, sulphur) if oil is used as fuel in the lime sludge reburning kiln. Some raw materials used in the manufacture of cellulose pulp also may contain in their cells lots of silica ($SiO_2$). The most usual of these are annual plants such as bamboo, sugar cane, rice and wheat. It has also been discovered that some tropical wood species contain such amounts of silicon that are detrimental for pulp production processes.

When pulp is manufactured using the sulphate method the cooking liquor used, or black liquor, is evaporated, combusted and the residue obtained, the so-called soda smelt, is dissolved in water. The green liquor thus formed is causticized to produce cooking liquor. During the causticizing process, the sodium carbonate contained in the green liquor is allowed to react with burnt lime (CaO) as follows. First, lime slaking takes place:

$$CaO + H_2O \rightarrow Ca(OH)_2 \quad (1)$$

Subsequently, the causticizing reaction itself takes place:

$$Ca(OH)_2 + Na_2CO_3 \rightarrow 2NaOH + CaCO_3 \quad (2)$$

The mixture thus produced contains sodium hydroxide (white liquor) and calcium carbonate (lime sludge) is separated and the white liquor is recirculated to pulp digestion. White liquor and lime sludge may be separated either by settling or filtering. White liquor filters are usually conventional candle filters or drum or disc filters operating with pressure or vacuum. Lime sludge is washed in order to remove alkali therefrom. Lime sludge is thickened in a lime sludge filter for combustion in a calcinating device such as lime sludge reburning kiln in which the lime sludge is regenerated to calcium oxide to be returned to the causticizing. This circulation process of lime is called the lime cycle.

In the chemical recovery system of a pulp mill the material flow described above is partly cleaned as part of the soda smelt does not dissolve in the soda dissolving stage and the so-called green liquor sludge formed is removed. Undesirable substances may thus be removed from the process in this way.

The problem in the process is that certain impurities are not easily removed because they are not sparingly soluble enough and thus to a large extent remain in the solution. For example phosphor, silicon and vanadium compounds as well as many other compound are this kind of substances. These compounds tend to precipitate during causticizing in the lime sludge and thus build up in the lime cycle. For example silicates precipitate as calcium hydrosilicates to the lime used in the causticizing process. In this way, impurities are accumulated with time in the lime sludge which means that the lime sludge is contaminated. Phosphor tends to concentrate in the fine dust of the lime sludge reburning kiln and it has been desirable to try to remove it in this form. Fine dust has sometimes been used as phosphor-containing soil conditioner.

Contamination of lime sludge results in various problems, for example deposit rings and balls accumulate in the lime sludge reburning kiln, filtration of white liquor becomes difficult and burnt lime passivates, i.e. it is bound in non-reactive compounds. For this reason, at least a part of the lime sludge must be replaced from time to time, i.e. a part of the lime sludge must be removed continuously and the lime cycle must thus be kept open to some extent.

A further problem is that the lime sludge discharged must either be transported to a landfill area or used to neutralize acid effluents from a pulp bleaching process whereby phosphor and other impurities end up in watercourses.

Further, as the tendency today is to close the water circulation of a pulp mill and to return the bleaching effluents to the process the impurity load of the chemical circulation system increases and drawbacks become more severe.

Instead of destroying the fouled lime it has been suggested to separate the silica already from the black liquor by lowering the pH of the liquor with carbon dioxide to a range of about 9.1–10.2. The solubility of the silica dissolved in the black liquor in ion form, mostly as $HSiO_4^{3-}$ and $SiO_3^{3-}$, decreases and it precipitates as colloidal silica gel. It has been reported that even 90% of the silicate may be separated from weak black liquor (6 g $SiO_2$/l) by a method developed by The United Nations Development Organization (UNIDO) and the Swedish International Development Authority (SIDA). In that case carbon dioxide is bubbled in a bubbling reactor into black liquor and subsequently the precipitated silica is separated by filtering. CPPRI and Lurgi have developed similar approaches.

Silica may be separated from green liquor with carbon dioxide in the same way as from black liquor. Green liquor may contain about 10–20 g $SiO_2$/l of silicate, sometimes even more, depending on the raw material used, which is remarkably more that in weak black liquor, and therefore better yield may be expected. Separation of silica precipitate from green liquor is not as problematic as from black liquor since organic matter is not present in green liquor. A drawback of this method is that odorous sulphur-containing compounds such as hydrogen sulphide are released when sulphate liquor is treated with carbon dioxide.

Another known method of removing silicon from green liquor is to add lime (CaO or $Ca(OH)_2$) to the green liquor whereby silicon precipitates with the lime and this lime rich in silicon may be removed. It has been suggested to divide the causticizing process of green liquor in two stages and to add part of the total volume of lime required in the causticizing process to the first stage. Then silicon precipitates as calcium silicate in the lime sludge produced and the silicon-rich lime sludge may be discharged. The remaining portion of the lime is added to the second stage and this lime is circulated in the process. A limitation of this method is that a high silicon removal rate is achieved only if the silicon content of the green liquor is high, for example more than 12 g/kg $H_2O$.

The object of the present invention is to eliminate the drawbacks mentioned above.

In particular the object of the invention is to provide a new kind of method of separating detrimental impurities from the chemical circulation of a pulp mill, particularly from lime cycle.

A further object of the invention is to prolong the operating life of lime sludge in a pulp process.

A further object of the invention is to provide a method of recovering more efficiently and reusing the useful chemicals of a pulp process. Particular attention is paid to a feature of separating the impurities discussed above in a readily separable form and from solutions which contain low concentrations of these impurities.

Further, an object of the invention is to provide a method by which the chemical circulation of a pulp process may be closed as far as possible.

The characteristic feature of the invention are defined in the appended patent claims.

The invention is based on the observation made in tests performed that by soaking lime-containing material such as lime sludge in a solution of carbonate or hydrocarbonate, preferably having a high concentration of carbonate or hydrocarbonate, anions ($CO_3^{2-}$, $HCO_3^-$) which are difficult to separate are dissolved and may thus be separated from the lime sludge or lime. Thus, the invention makes use of the solubility properties and products in the conditions mentioned in a new way.

In the context of the present invention the term lime means material containing calcium oxide (CaO) or calcium hydroxide ($Ca(OH)_2$) used in the mill for carrying out for example causticizing processes. The term lime sludge means material which contains calcium carbonate ($CaCO_3$)

The solubility of sparingly soluble substances is often expressed as solubility product as follows:

$$L_{MemXn}=[Me]^m[X]^n \quad (3)$$

in which Me is a metal ion; X is an anion forming a sparingly soluble salt with the metal ion in question; m and n are integral numbers; parentheses [ ] express concentration; and L is solubility product which with certain conditions is constant.

The solubility product is in fact constant only with dilute solutions in which the ionic strength or the value expressing the summed concentration of all ions is low. If there are large amounts of dissolved salts in the solution which means that the ionic strength is high the equation (3) is valid only if the concentrations are replaced by activities. The connection between the activity and the concentration is:

$$a=F[A] \quad (4)$$

in which a is the activity of the substance; [A] is its concentration and f is the activity coefficient. The solubility product is then:

$$L_{MemXn}=a_{Me}^m a_x^n \quad (5)$$

Information on the activity coefficients are often not available for concentrated solutions having complicated compositions. However, it is not necessary to know them in order to recognise the efficiency of the method of the invention.

If anion X is a carbonate, rising its activity results in a decrease in the activity of all metal ions forming sparingly soluble carbonates while the solubility product remains constant. This presupposes that their concentration in the liquid is sufficiently high to be in balance with solid carbonate.

Me may be any metal ion meeting these requirements. The carbonate activity may be raised by a readily soluble salt such as sodium carbonate. A decrease in the activity of the metal ions results, according to equation (5), in dissolving of other anions X than carbonate, which also form sparingly soluble compounds with the same metals and are present in the form of precipitate in the lime sludge; i.e. the activities of anions in the solution increase.

Metals which form poorly soluble carbonates in the conditions discussed and the activity of which in the solution may be decreased, are primarily calcium, barium, iron, manganese, magnesium, etc. Anions the activity of which may be raised by this method are primarily $PO_4^{3-}$, $SiO_3^{2-}$, $VO_4^{3-}$, $SO_4^{2-}$, etc.

The exact form of the anion, for example $SO_4^{2-}$ vs. $SO_3^{2-}$ or $VO_4^{2-}$ vs. $V_2O_5^{2-}$, need not necessarily be known, neither the metal with which it has precipitated. The only prerequisite of the method of the invention is that anions and cations are in balance with the solid phase according to equation (5).

Sparingly soluble compounds the anions of which may be dissolved when the activity of the metal ion decreases are for example the following:

$L_{Ca3\,(PO4)2}=a_{Ca3}\cdot a_{PO42}$ calcium phosphate $L_{CaSiO3}=a_{Ca}\cdot a_{Sio3}$ calcium metasilicate $L_{CaSO4}=a_{Ca}\cdot a_{SO4}$ calcium sulphate $L_{Ca3\,(VO4)2}=a_{Ca3}\cdot a_{VO42}$ calcium vanadate $L_{CaHVO4}=a_{Ca3}\cdot a_{HVO4}$ calcium hydrogen vanadate $L_{Fe3(PO4)2}=a_{Fe3}\cdot a_{PO42}$ iron phosphate $L_{BaSO4}=a_{Ba}\cdot a_{SO4}$ barium sulphate According to the method of the invention, lime sludge is soaked preferably in a strong solution of carbonate or hydrocarbonate, for example in a solution of potassium, sodium or ammonium carbonate or hydrocarbonate. An increased carbonate or hydrocarbonate content decreases the calcium concentration of the solution in a way required by the solubility product. The same happens with other cations forming sparingly soluble carbonates or hydrocarbonates. When the concentrations of calcium and other cations decrease the solubility of anions, such as phosphate, silicate, vanadate, sulphate, sulphite, etc., which form sparingly soluble salts with them, increase correspondingly in a way required by the solubility product of the salts. These anions precipitated in the lime sludge are thus dissolved. After the soaking, the lime sludge and the solution, i.e. the dissolved impurities are separated from each other by any method known per se.

When for example a solution of sodium carbonate is used as the lime sludge soaking solution, the sodium is purified and reused or it is recycled to cooking chemical preparation. Separating the sodium carbonate by crystallization is advantageous as the sodium carbonate concentration remaining in the impurity concentrate is then as small as possible (see Table 1. Solubility of sodium carbonate in water).

The volume of the impurities concentrate to be removed may be adjusted by choosing for the soaking a suitable carbonate concentration, a suitable crystallizing temperature and by proceeding the crystallization suitably far. A suitable carbonate concentration when using for example sodium carbonate is about 5 g/l—saturated solution, preferably about 200–400 g/l. Sodium carbonate containing 7 to 10 crystal water, binds a large volume of water and the impurities may be concentrated in a small volume of liquid. The limit is set by the solubility of the impurities. If the limit is exceeded the impurities precipitate with the sodium carbonate and the purifying efficiency of the crystallization decreases. If necessary the carbonates may be dissolved in water and recrystallized, thus reducing the amount of impurities entrained with the carbonate back to the soaking.

According to the method of the invention the lime sludge and the carbonate solution, preferably sodium carbonate solution, used in the dissolving are separated from each other for example by filtering, centrifuging, sedimenting or by other known methods. The lime sludge may also be washed with water to intensify the cleaning.

TABLE 1

| T° | solid | g mol/ 1000 g $H_2O$ | $Na_2CO_3$/ 100 (g/g) $H_2O$ | Sat. Sol | density | steam pressure Hg |
|---|---|---|---|---|---|---|
| −2.10 | $Na_2CO_3.10H_2O$ + ice | 0.575 | 6.10 | 5.75 | 1.056 | — |
| 0 | " | .66 | 7.0 | 6.54 | — | — |
| 5 | " | .84 | 8.90 | 8.2 | — | — |
| 10 | " | 1.14 | 12.1 | 10.8 | — | — |
| 15 | " | 1.55 | 16.4 | 14.1 | 1.1515 | 12.3 |
| 20 | " | 2.09 | 22.2 | 18.1 | 1.1941 | 16.9 |
| 25 | " | 2.77 | 29.4 | 22.7 | 1.2416 | 21.4 |
| 30 | " | 3.70 | 39.2 | 28.2 | 1.342 | 26.8 |
| 32.00 | $Na_2CO_3.10H_2O$ + $Na_2CO_3.7H_2O$ | 4.28 | 45.4 | 31.2 | — | 29.0 |
| m32.96 | $Na_2CO_3.10H_2O$ + $Na_2CO_3.H_2O$ | 4.71 | 49.9 | 33.3 | — | 29.5 |
| m30 | $Na_2CO_3.H_2O$ | 4.78 | 50.7 | 33.6 | | — |
| 35.37 | $Na_2CO_3.7H_2O$ + $Na_2CO_3.H_2O$ | 4.67 | 49.5 | 33.1 | | 34.0 |
| 40 | $Na_2CO_3.H_2O$ | 4.60 | 48.4 | 32.8 | | 43. 6 |
| 50 | " | 4.48 | 47.5 | 32.2 | | 74.1 |
| 60 | " | 4.37 | 46.3 | 31.6 | | 121.5 |
| 70 | " | 4.30 | 45.6 | 31.3 | | 192.7 |
| 75 | " | 4.28 | 45.4 | 31.2 | | 239.8 |
| 80 | " | 4.26 | 45.2 | 31.1 | | 296.2 |
| 90 | " | 4.24 | 44.9 | 31.0 | | 442.4 |
| 100 | " | 4.22 | 44.7 | 30.9 | | 631.7 |
| 104.8 | " | 4.21 | 44.6 | 30.8 | | 760.0 |
| 109 | $Na_2CO_3.H_2O$ + $Na_2CO_3$ | 4.20 | 44.5 | 30.8 | | 1.15 (Atm) |
| 110 | $Na_2CO^3$ | 4.20 | 44.5 | 30.8 | | 1.19 " |
| 113 | " | 4.20 | 44.5 | 30.8 | | — " |
| 120 | " | 4.03 | 42.7 | 29.9 | | 1.65 " |
| 130 | " | 3.86 | 40.9 | 29.0 | | 2.25 " |
| 140 | " | 3.71 | 39.3 | 28.2 | | 3.02 " |
| 150 | " | 3.57 | 37.8 | 27.4 | | 4.01 " |
| 160 | " | 3.44 | 36.5 | 26.7 | | 5.27 " |
| 180 | " | 3.16 | 33.5 | 25.1 | | 8.67 " |
| 200 | " | 2.89 | 30.6 | 23.4 | | 13.7 " |
| 220 | $Na_2CO^3$ | 2.56 | 27.1 | 21.3 | | 21.0 " |
| 240 | " | 2.16 | 22.9 | 18.6 | | 30.9 " |
| 250 | " | 1.95 | 20.7 | 17.1 | | 37.0 " |
| 260 | " | 1.75 | 18.6 | 15.7 | | 44.2 " |
| 280 | " | 1.32 | 14.0 | 12.3 | | 61.7 " |
| 300 | " | 0.88 | 9.3 | 8.5 | | 83.8 " |
| 350 | " | 0.19 | 2.0 | 2.0 | | 166 " |

The temperature at which the calcium-containing substance such as lime sludge is soaked affects the soaking efficiency. A high temperature is advantageous for the soaking efficiency but in view of the economy of the process it is favourable to use the waste heat from pulp digestion or other energy of little value, i.e. condensates of less than about 85° C. Thus the more valuable primary energy in the form of steam need not be used. A suitable soaking temperature according to an embodiment of the method of the invention is 20° C.—the boiling point of the solution preferably 80–110° C. The boiling point depends on the concentration and pressure of the carbonate-containing solution used. If desired, the lime sludge may be soaked at normal pressure or at a desired superatmospheric or subatmospheric pressure.

The solution/lime sludge ratio (weight of solution/weight of lime sludge dry solids) in the lime sludge soaking may be of the order of 2–20, preferably 6–15.

The carbonate may advantageously be crystallized from the carbonate solution containing impurities. The carbonate and the solution containing impurities may preferably be separated from each other.

Crystallizing sodium carbonate at a temperature of 5–20° C. produces pure decahydrate crystals and at a temperature of 35–90° C. produces pure monohydrate crystals. The crystallizing may be practices for example by cooling crystallization which produces decahydrate crystals or by evaporation which produces monohydrate crystals. In conventional evaporation heat is brought to the process which evaporated water and thus raises the carbonate content of the solution over the limit required by crystallization. The carbonate solution may be evaporated in order to crystallize the carbonate in a way known per se by one-stage or multi-stage evaporator. The evaporation may be carried out in a tube, lamella or flash apparatus.

In an embodiment, the suitable crystallization temperature range for the carbonate is −2–30° C. At the end stage a temperature of the solution of almost −2° C. is required to accomplish as complete crystallization as possible. Outer air may be used for the cooling the temperature of which is low enough for the most part of the year at least in the Nordic countries.

If desired the carbonate may advantageously be dissolved in water; water, preferably lime sludge wash water, may be added to it and the liquid produced may be used in the soaking of the lime sludge.

A suitable temperature for the dissolving of the sodium carbonate crystals is for example about 50° C. The condensate used for heating the soaking reactor may be used for raising the temperature to the desired level; in this way the heat may be reclaimed economically.

If desired the separated carbonate may be returned to the chemical circulation.

The solution containing impurities, the so-called concentrate may be discharged from the process. The impurities concentrate may be subjected to one or several recrystallization/s in order to recover useful chemicals, mostly carbonate crystals.

The above description refers mostly to the use of carbonate in the cleaning of lime sludge. However, also hydrocarbonate may be used in the solutions used for soaking the lime sludge in addition to the carbonate or to instead of it (0–100%). Hydrocarbonate may be recovered in a similar way as carbonate.

The water volume used in washing the lime sludge and the volume of the discharged solution containing impurities may preferably be balanced so as to keep the total volume of water in the process constant.

An interesting embodiment of the invention is removal of silicon and phosphor from lime sludge and lime containing high concentrations of these substances by dissolving them from the lime sludge or lime into a carbonate solution. A solution of this kind containing soluble carbonate forms with calcium sparingly soluble calcium compounds such as calcium carbonate and preserves the solubility of calcium low, thus no silicate precipitates. Preferably the solution of this kind is green liquor or some other solution containing carbonate, particularly potassium carbonate. If the carbonate solution such as green liquor contains also silicon the invention is preferably practised at a silicon concentration of about 0.8–12 g $SiO_2$/kg $H_2O$, preferably 1–6 g $SiO_2$/kg $H_2O$. When silicon has been removed from the lime sludge or lime to the solution the solution may be cleaned from these substances. For this purpose, such an amount of lime is added to liquor which is sufficient to precipitate the silicon from the liquor. Lime obtained by combusting lime sludge which has been purified earlier, or more reactive lime obtained for example by combusting porous limestone may be used for the precipitation. The advantages of the invention are obvious here as the volume of lime required for precipitating the silicon is substantially smaller than the volume of purified lime or lime sludge and thus the volume of silicon-rich lime sludge, which must be wasted, is small.

Dissoluble silicon reacts with lime and forms calcium hydrosilicates when the amount of silicon in the green liquor coming to the causticizing process is larger than in the white liquor produced. These hydrosilicates react in the lime sludge reburning kiln with lime and form calcium silicates in which the $CaO/SiO_2$ ratio is higher than in the original calcium hydrosilicate. The calcium silicate most likely formed is β-dicalcium silicate. The results of thorough thermodynamic analyses of the compounds formed by silicon and lime, experimental studies and computer simulations based on these show that in the causticizing the solution is not supersaturated with calcium silicate hydrate which is in metastable balance with β-dicalcium silicate but the β-dicalcium silicate coming in with the lime tends to dissolve from the lime to the solution until the amount of the dissolved silicon in the solution and the amount of added lime have reached a certain level. When the calcination advances the solution becomes supersaturated with calcium silicate hydrate and the silicon in the solution begins to precipitate as calcium silicate hydrate. Compounds of this kind are for example hydrosilicates like tobermorite ($4CaSiO_3*Ca(OH)_2$) and jennite ($4CaSiO_35Ca(OH)_2$).

The invention is particularly advantageously applied in a causticizing process in a pulp mill. Most preferably the causticizing is practised in two stages and 40–90%, preferably 50–70% of the total lime volume required is added in the first stage in the flow direction of the green liquor (as generally known, the total lime volume required in the causticizing is the volume of lime, the amounts exceeding which cause calcium hydroxide to remain in the lime sludge to a harmful extent). When adding in the first stage the amount of lime mentioned silicon does not precipitate but on the contrary the silicon possibly contained in the lime dissolves from the lime to the liquor. Thus, from the first causticizing stage lime sludge is obtained which is clean as far as silicon is concerned, i.e. the silicon content of the lime sludge is substantially lower than that of the lime fed into the causticizing process. The rest of the lime required for the causticizing, i.e. 10–60%, preferably 30–50%, is added in the second stage and the silicon contained in the liquor is concentrated in the lime sludge. A part of this lime sludge may be discharged from the process in order to reduce the silicon load of the lime circulation and the rest may be mixed with the silicon-poor lime sludge obtained from the first stage. The lime sludge mixture is regenerated to lime in a lime sludge combustion apparatus such as lime sludge reburning kiln. The silicon and/or phosphor concentrations in the chemical circulation of a pulp mill may be controlled in this way.

Also the alkali content of the green liquor may have an effect when practising the invention. As known, green liquor is produced by dissolving the chemical smelt obtained from the combustion of black liquor in water or weak white liquor which is produced in washing of lime sludge after separation of white liquor. One of the main purposes of washing lime sludge is to remove alkali (NaOH) from the lime sludge as completely as possible. If separation of white liquor and lime sludge is not efficient, much alkali remains in the lime sludge and further in the weak white liquor. If weak liquor rich in alkali is used in the dissolving of smelt the alkali content of the green liquor will correspondingly be higher which in turn reduces the share of sodium carbonate in the green liquor. Pressurized disc filter, the use of which is presently becoming more common, separates more efficiently white liquor and lime sludge so that in the washing of lime sludge the content of NaOH in the weak white liquor is only about 5 g/l.

When the alkali content of the green liquor is kept as low as possible by dissolving the smelt in a solution containing as little NaOH as possible, the share of soluble sodium carbonate in the green liquor increases. Then the lime contained in the liquor reacts to a larger extent according to the reaction equation (2) and does not precipitate soluble silicon. Thus the amount of lime added in the causticizing stage may be increased and more silicon is dissolved in this causticizing stage and as a result also more cleaned lime sludge is obtained. Then the amount of lime in the final causticizing stage in which silicon accumulates is smaller.

The same kind of results are obtained when the silicon content of the green liquor is reduced before causticizing. This may be brought about, as previously described, by pretreatment of green liquor or black liquor with carbon dioxide-containing gas. An advantageous method of reducing the silicon content in green liquor is disclosed in PCT patent application no. PCT/FI95/00556 according to the method of which sodium carbonate-containing smelt obtained from combustion of black liquor is pretreated so that the sodium carbonate is recovered in solid form whereas silicon and/or phosphor are separated as a solution containing dissolved sodium silicates/sodium phosphates.

Causticizing may be practised also by a countercurrent method, in which liquor and lime flow in opposite directions. The process preferably comprises one step or several steps. In this case all the lime required in the causticizing is added in the last step relative to the liquor flow. Between the steps, lime/lime sludge and liquor are separated from each other. The liquor is transported to the next step and the separated lime/lime sludge is guided to the previous step relative to the liquor flow. The most impure lime sludge is the one separated from the last step, and a small portion (for example ⅕) of it is discharged from the process and the rest of it is guided countercurrent to the liquor flow and discharged from the first step.

The invention described above may be applied also elsewhere in a pulp mill and not only in the causticizing. Prior to concentration of the lime sludge, a part of the lime sludge flow may be treated with green liquor or a corresponding solution for example in a mixing tank to dissolve silicon. After this the lime sludge is separated, washed and transported to a lime sludge filter for thickening.

According to another embodiment lime sludge is treated for example outside the mill building in a similar way as low-grade ores are dressed with the so-called heap leaching method. In this case the leaching medium is green liquor or other carbonate solution with which the lime sludge heap is treated to remove silicon and corresponding impurities therefrom. This embodiment may be employable in some circumstances, for example in the treatment of old silicon-rich lime sludge supplies and subsequently the purified lime sludge of this kind may be reused. Silicon is removed from lime sludge treatment solutions by precipitating with lime whereby the solution may be circulated but silicon has been concentrated from the original to a remarkably smaller lime sludge volume which is discharged.

The life of lime sludge may be prolonged substantially by employing the invention, i.e. by cleaning the lime sludge or other calcium-containing material according to the invention. Further, the invention provides cost savings due to the longer life of lime sludge and saving of other chemicals; the demand of purchase lime drops and the landfill costs and costs for transport to a landfill area are reduced. By employing the invention, for example silicon may be removed from liquors which contain harmful amounts of silicon but, however, less than could be removed economically by known methods.

Further, due to the invention, less detrimental compounds from pulp production end up in the environment.

Further, the invention reduces the need of opening the lime circulation, i.e. it facilitates closing the chemical circulation.

DETAILED DESCRIPTION OF THE DRAWINGS

Figure 1:
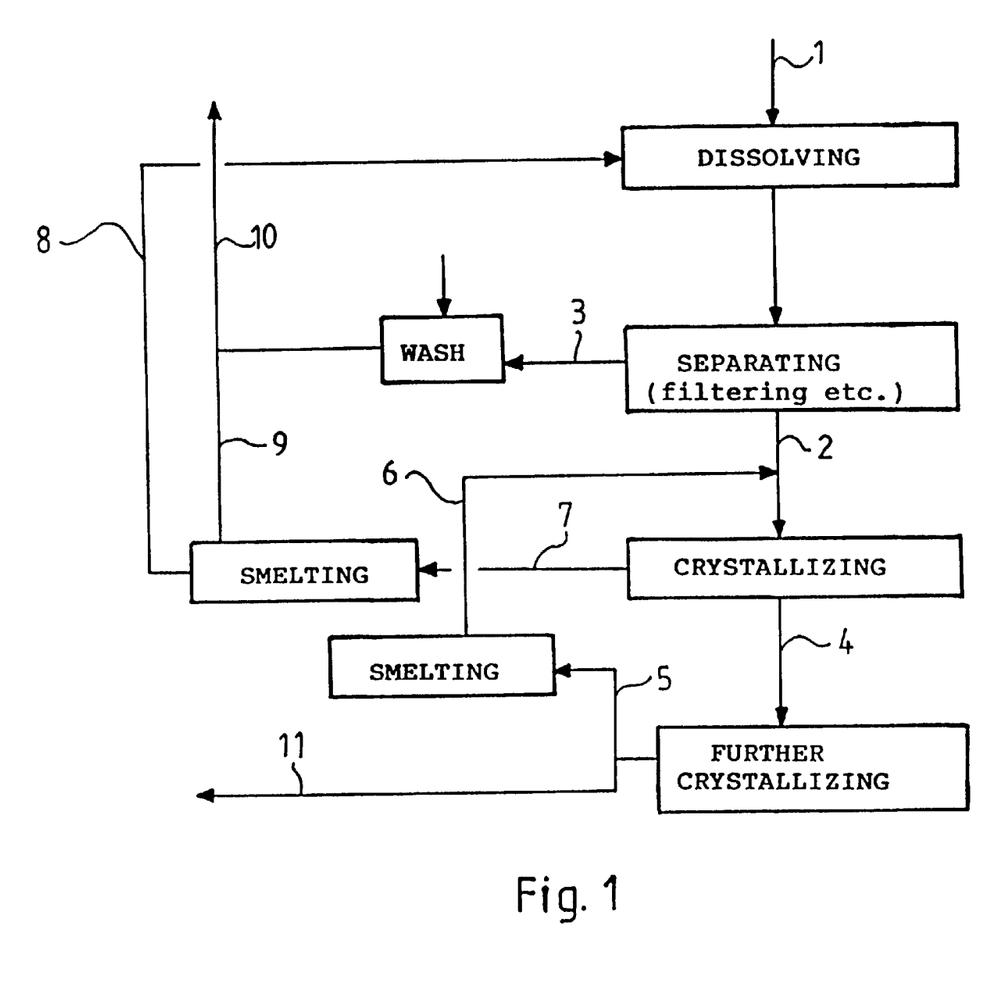
FIG. 1 illustrates the flow sheet of an embodiment of the method of the invention.

In FIG. 1, lime sludge 1 is carried to a soaking vessel containing strong carbonate-containing solution, for example sodium carbonate. After the soaking, lime sludge and the soaking solution are separated from each other e.g. by filtering and subsequently the separated carbonate solution 2 containing impurities is conveyed to a crystallizing vessel and the separated lime sludge 3 is take to a wash. The carbonate crystals 7 obtained is dissolved and the carbonate solution 8 obtained in this way is recycled to the soaking vessel. The cleaned lime sludge 10 is returned to the pulp process. Subsequent to the crystallizing, the separated impurities-containing solution is transported to further crystallizing and the crystals obtained therefrom are dissolved and the dissolved carbonated crystals 6 are returned to the original crystallizing vessel. The impurities-containing solution 11 obtained from the further crystallization is discharged from the process.

EXAMPLE 1

The Effect of the Volume of the Soaking Liquid on the Impurities Content

Figure 2:
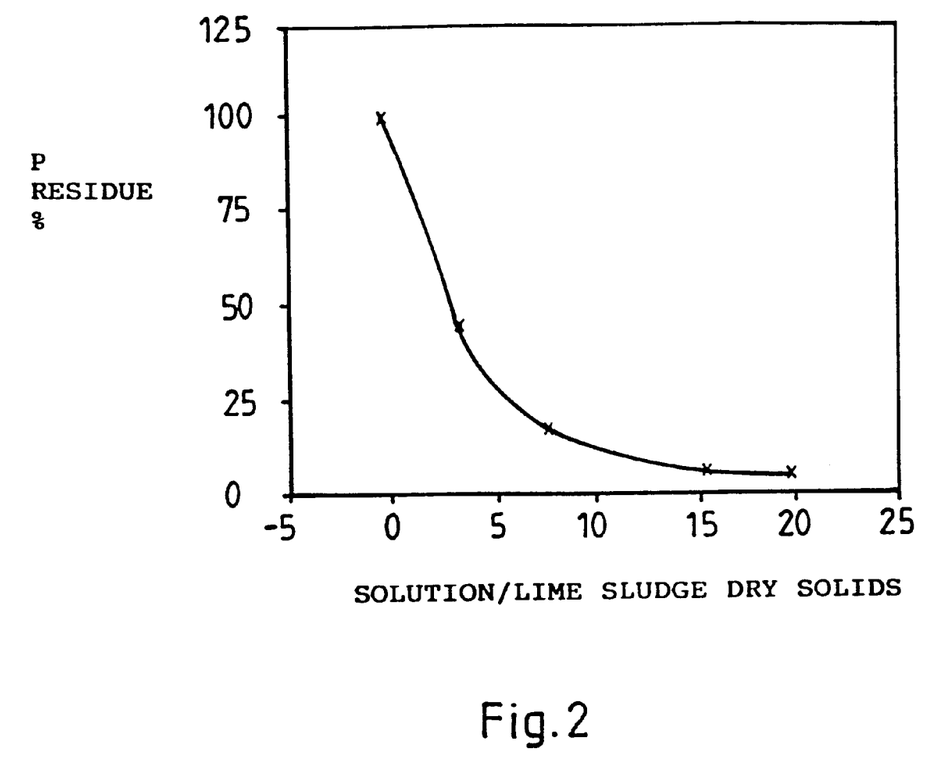
FIG. 2 illustrates the impurities concentration as a function of the solution/lime sludge ratio.
Figure 3:
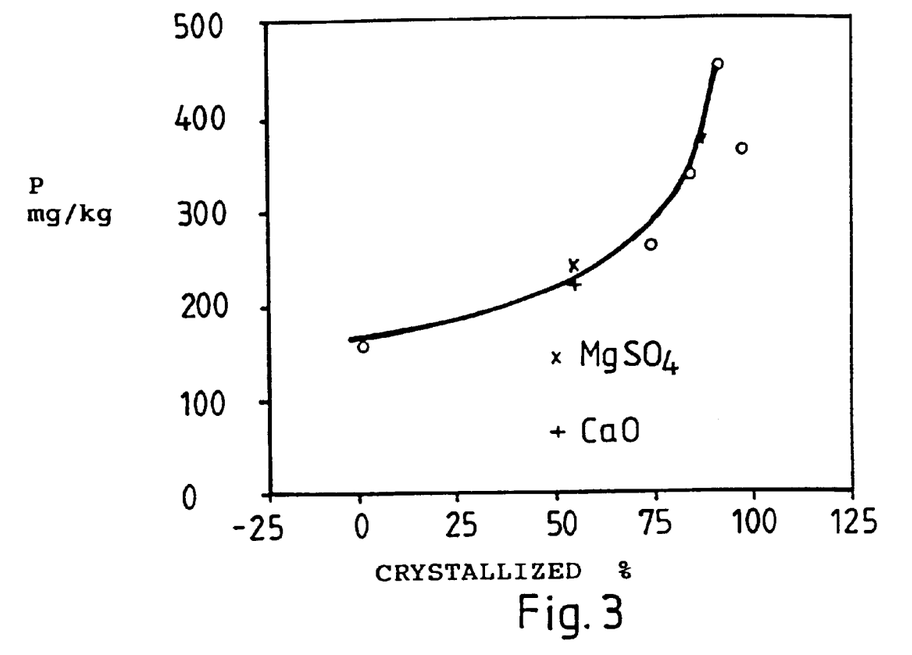
FIGS. 3–8 illustrate substance concentrations in the solution when $Na_2CO_3$ has been removed from it by crystallizing.
Figure 4:
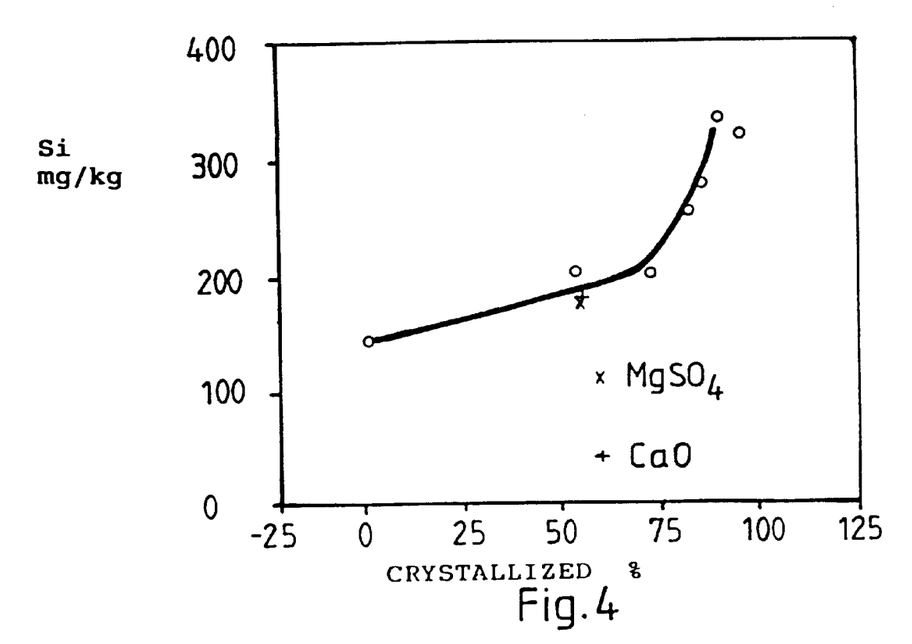
Figure 5:
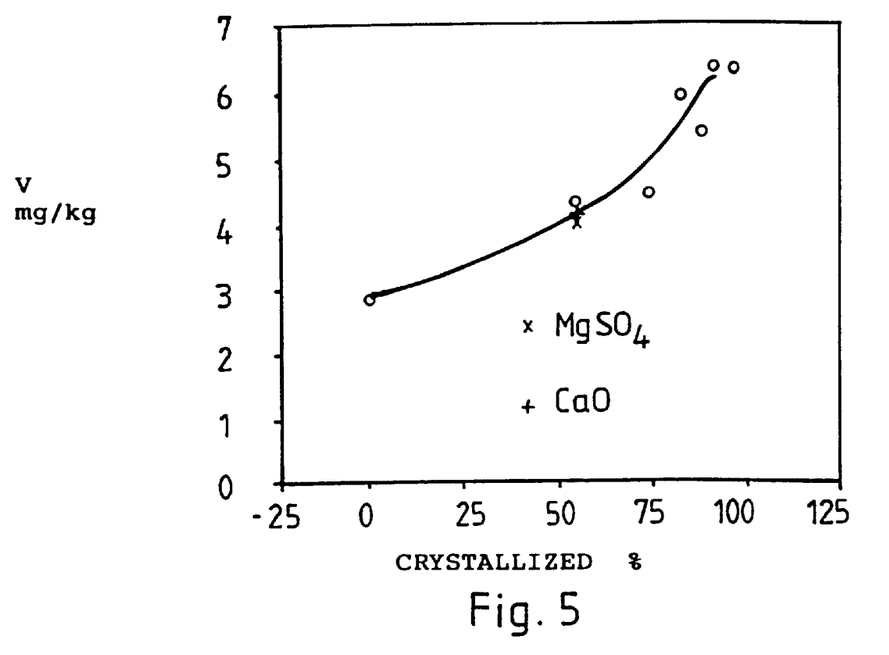
Figure 6:
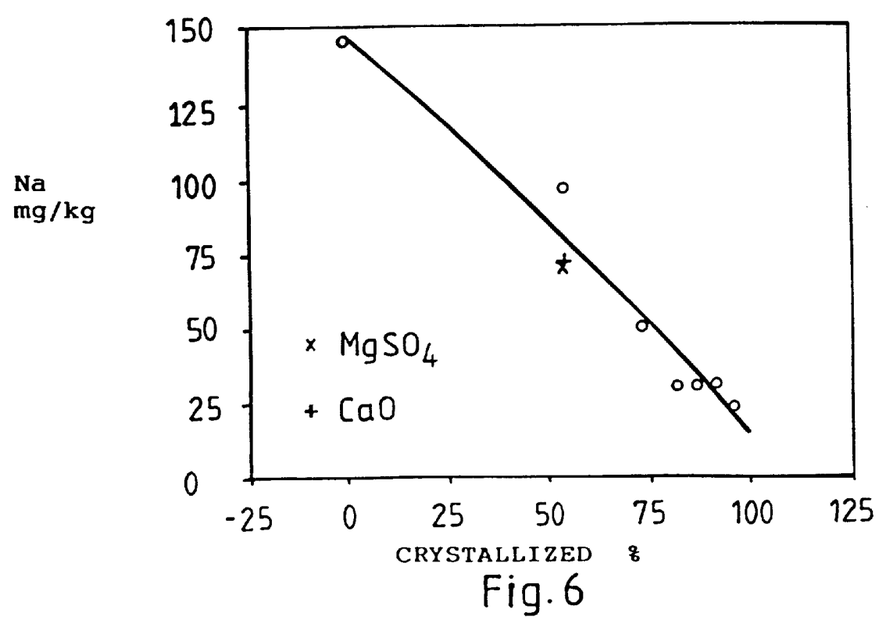
Figure 7:
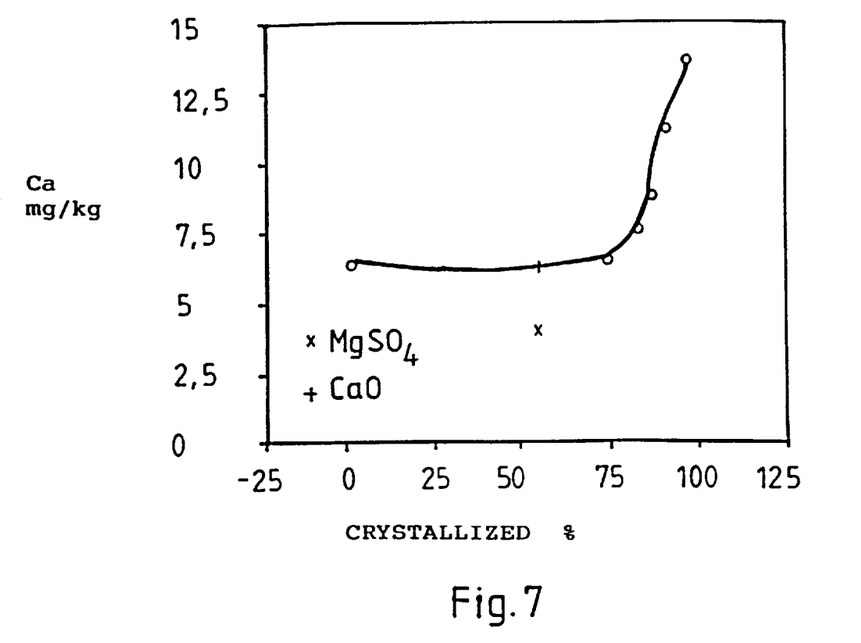
Figure 8:
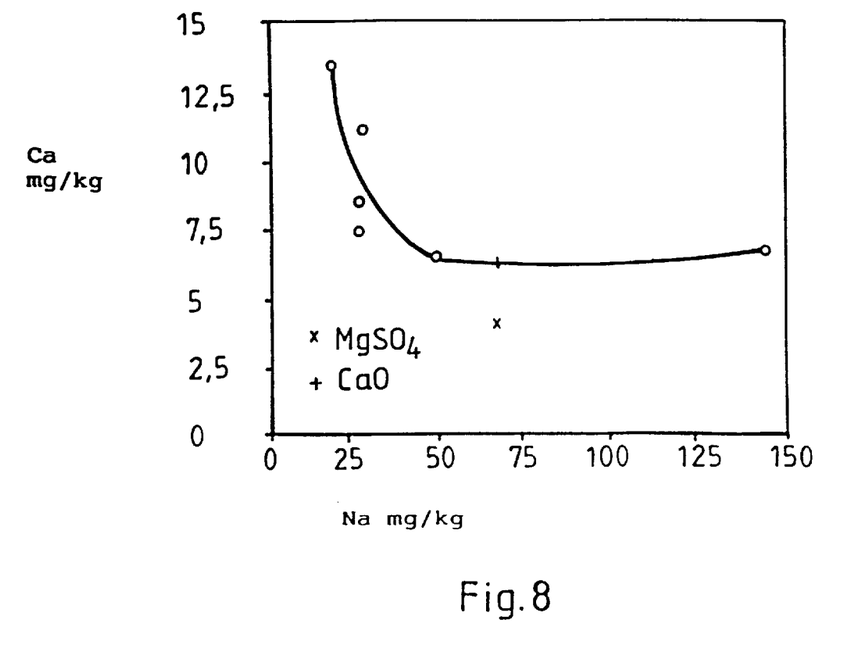

A lime sludge sample was soaked in a sodium carbonate solution having a solution/lime sludge ratio (weight of solution/weight of dry solids of lime sludge) of 3.9–19.6. The solution had been produced by dissolving 400 g of $Na_2CO_3$ in 1000 ml of water. The temperature was 90° C. and the soaking time 6 hours. The mixture was mixed during the test. After the soaking, the solution and the lime sludge were separated from each other when warm by suction filtration. The lime sludge was washed with water. The phosphor content of the lime sludge and the carbonate solution were determined. The results are presented in FIG. 2. The analysis results are presented in Table 2.

TABLE 2

| | | solution/ lime sludge ka | P g/kg | P residue % |
|---|---|---|---|---|
| 1 | Untreated lime sludge | 0 | 1.83 | 100.0 |
| 2 | Treated lime sludge | 3.91 | 0.744 | 40.7 |
| 3 | " | 7.82 | 0.328 | 17.9 |
| 4 | " | 15.65 | 0.109 | 6.0 |
| 5 | " | 19.56 | 0.095 | 5.2 |

EXAMPLE 2

Removal of Impurities

A lime sludge sample was soaked in a sodium carbonate solution like in test 1 with a solution/lime sludge ratio of 9.8. Subsequent to the soaking, the lime sludge was washed twice in water with a lime sludge/water ratio of 2.8. After the treatment, contents of different substances in the lime sludge were determined. The results are presented in Table 3.

TABLE 3

Concentrations of different substances in lime sludge before and after treatment

|  | Original lime sludge concentration g/kg | Treated lime sludge concentration g/kg | Removal % |
|---|---|---|---|
| Phosphor P | 1.83 | 0.343 | 81.3 |
| Silicon Si | 0.643 | 0.273 | 57.5 |
| Aluminium Al | 0.754 | 0.710 | 5.8 |
| Sulphur S | 5.30 | 0.56 | 89.4 |
| Vanadium V | $39.5 \times 10^{-3}$ | $9.4 \times 10^{-3}$ | 76.2 |

The results indicate that phosphor, sulphur and vanadium may be efficiently removed at a solution/lime sludge ratio of 9.8. Silicon may be removed fairly efficiently while aluminium is poorly removed.

Examples 1 and 2 indicate that phosphor may be removed very efficiently by soaking in carbonate solution. A very high solution/lime sludge ratio results in that large amounts of carbonate must be crystallized to clean a small amount of lime sludge. Operating the process economically presupposed optimizing of the solutions/lime sludge ratio whereby attention should be paid to the fact that reducing the solution/lime sludge ratio impairs the cleaning efficiency.

EXAMPLE 3

Effect of Soaking Conditions

The effect of different conditions on the removal of different impurities (phosphor, silicon, and aluminium) was tested by using different solution/lime sludge ratios, different soaking times, different temperatures and carbonate soaking solutions of different concentrations. The results are presented in Tables 4, 5 and 6.

TABLE 4

Removal of phosphor in different conditions

| Solution/ lime sludge ratio | Soaking solution | Time h | T °C. | Solution mg/kg* | Lime sludge mg/kg | Removal % |
|---|---|---|---|---|---|---|
| 10 | water | 1.5 |  | 0.04 | 1370 | 0.003 |
| 10 | water | 96 | 75 | 2.14 | 1330 | 0.16 |
| 10 | water + 5 g/l Na$_2$CO$_3$ | 96 | 75 | 143 | 1200 | 10.6 |
| 10 | water + 5 g/l Na$_2$CO$_3$ | 6 | 70 | 102 | 1240 | 7.6 |
| 10 | water + 50 g/l Na$_2$CO$_3$ | 6 | 70 | 628 | 745 | 45.7 |
| 16 | water 1000 ml + Na$_2$CO$_3$ 400 g** | 6 | 90*** | 1234 | 23.5 | 98.1 |

*mg phosphor transferred to the solution per kg lime sludge
**nearly saturated solution
***wash with water/lime sludge ratio 30

The results show that the sodium carbonate solution has a decisive influence on the dissolving of phosphor. Mere water dissolves phosphor very little but increasing the carbonate concentration improves the dissolving decisively. If the sodium carbonate solution is nearly saturated, the solution/lime sludge ratio is high enough and if lime sludge is adequately washed with water, a phosphor removal of as high as 98% or even more may be achieved. Operating the process in this way may, however, not be economical.

TABLE 5

Removal of silicon

| Solution/ lime sludge ratio | Soaking solution | Time h | T °C. | Distribution of silicon | | Removal % |
|---|---|---|---|---|---|---|
|  |  |  |  | Solution g/kg | Lime sludge g/kg |  |
| 16 | water 1000 ml + Na$_2$CO$_3$ 400 g | 6 | 90* | 6.24 | 0.40 | 94.0 |

*wash with water/lime sludge ratio 30

TABLE 6

Removal of aluminium

| Solution/ lime sludge ratio | Soaking solution | Time h | T °C. | Distribution of aluminium | | Removal % |
|---|---|---|---|---|---|---|
|  |  |  |  | Solution g/kg | Lime sludge g/kg |  |
| 16 | water 1000 ml + Na$_2$CO$_3$ 400 g | 6 | 90* | 0.135 | 0.245 | 35.5 |

*wash with water/lime sludge ratio 30

94% of silicon was removed with the same conditions as with phosphor. Only about one third of the aluminium was removed regardless of the efficient conditions.

EXAMPLE 4

Cleaning of Sodium Carbonate Solution Used in Soaking

Subsequent to the soaking, the sodium carbonate solution must be cleaned for reuse. Economical use of the method presupposes that the amount of recycled impurities is small and that the loss of the soaking solution, usually sodium carbonate, is as small as possible, i.e. the amount of material, for example Na$_2$CO$_3$, discharged with the impurities concentrate is small.

Cleaning and recovery of the sodium carbonate used in the soaking was tested by crystallizing the sodium carbonate from the impurities-containing dissolving solution. Also calcium oxide and magnesium sulphate were used in the test to precipitate impurities. The results are presented in FIGS. 3–8. The figures illustrate the concentrations of the impurities remaining in the impurities solution as a function of crystallization. The analysis results used as the basis for the curves are presented in Table 7.

TABLE 7

Impurities in a solution portion

| Solution volume g | Crystal. % | P mg/kg | Si mg/kg | V mg/kg | Na mg/kg | Ca mg/kg | Note |
|---|---|---|---|---|---|---|---|
| 1 | 1397 | 0.0 | 159.0 | 141.4 | 2.84 | 144.8 | 6.46 | |
| 2 | 647.2 | 53.7 | 234.4 | 197.6 | 4.26 | 95.5 | | |
| 3 | 637.2 | 54.4 | 231.9 | 176.8 | 3.93 | 67.9 | 3.89 | * |
| 4 | 633.5 | 54.7 | 213.4 | 175.5 | 3.96 | 69 | 6.09 | ** |
| 5 | 381.7 | 72.7 | 257.7 | 196.7 | 4.42 | 49.5 | 6.41 | |
| 6 | 253.8 | 81.8 | 331.8 | 247 | 5.83 | 28 | 7.45 | |
| 7 | 203.9 | 85.4 | 369.8 | 273.2 | 5.3 | 28 | 8.68 | |
| 8 | 145.4 | 89.6 | 447.0 | 328.7 | 6.26 | 29.2 | 11.1 | |
| 9 | 64.1 | 95.4 | 357.1 | 314.3 | 6.23 | 20.1 | 13.4 | |

*MgSO4 precipitation
**CaO precipitation

The results indicate among other things that when the solution from the soaking was crystallized so far that the crystal portion constituted about 54% of the weight of the solution and the crystals were washed after suction filtration with light spraying, low impurities concentrations were obtained.

The most important results of sodium carbonate cleaning are presented in Table 8.

TABLE 8

Cleaning of sodium carbonate by crystallizing and spraying

| Impurity | Solution from soaking mg/kg | Carbonate crystals after cleaning | |
|---|---|---|---|
| | | mg/kg | %* |
| P | 159 | 14.8 | 2.7 |
| Si | 141 | 21.6 | 10.4 |
| V | 2.84 | 0.19 | 2.6 |

*amount remaining in crystals, percentage of total amount contained in lime sludge When the solution is crystallized further cleaning is not as efficient but more impurities remain in the crystal portion. Then, recrystallization is needed. Test results indicate that recrystallization should be used when about 55–90% of the solution has been crystallized. When about 90% has been crystallized no cleaning takes place but as much impurities remain in the crystal portion as in the solution.

Crystallization is brought about by cooling and the solubility of tile sodium carbonate decreases with the temperature decrease. When about 90% of the solution has been crystallized and the temperature is about 0—2° C. the solubility is only 5–7% (see Table 1). In the test, only 1.6% of the sodium supplied to the process remained when about 90% of the solution had been crystallized. Thus it may be stated that the amount of sodium removed with the impurities concentrate is small.

The test also show that if it is desirable to precipitate impurities with calcium oxide or magnesium sulphate this should be done only at the end stage of the process where the carbonate concentration is low. If precipitation is carried out at the beginning stage where the carbonate concentration is high, calcium and magnesium precipitate at once as carbonates and have no effect on the phosphor, silicon and other concentrations. Only when the carbonate content has decreased adequately the calcium and magnesium concentrations may rise to a level to cause precipitation of the substances mentioned.

Further, the test show that it may be more advantageous to use the lime sludge wash water in the dissolving of the recrystallized crystal portion than in the dissolving of the first crystal portion. In this way the share of the returned impurities may be minimized.

FIGS. 3–8 also indicate that the calcium content rises only when the carbonate content is low.

Despite its small volume the impurities concentrate contains a certain amount of sodium which because of the economy and environmental reasons should be returned to the process. The estimated amount is 20–45 kg sodium per ton of lime sludge. Because only a portion of the lime sludge flow is treated according to this method to bring the phosphor balance of the mill into equilibrium, the sodium amount per pulp ton is however smaller, the estimate is about 3 kg.

There are various ways available for returning the sodium to the process. For example the impurities concentrate may be treated with sulphur acid to neutralize it, the imparities may be precipitated with calcium oxide or magnesium sulphate and the sodium may be returned in sulphate form to the chemical circulation of the pulp mill.

Figure 9A:
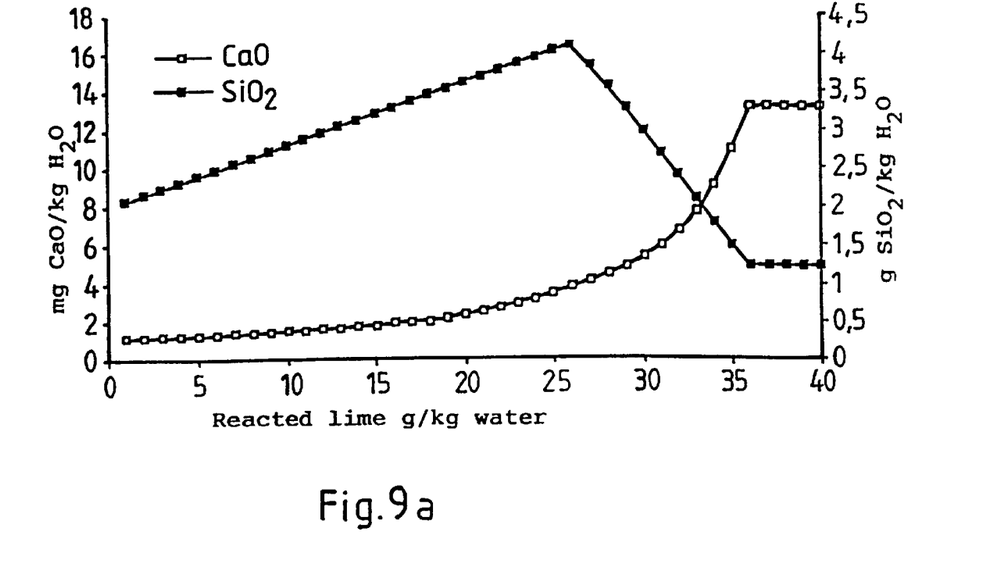
FIGS. 9a and 9b illustrates a simulation test to present the principle of the invention.
Figure 9B:
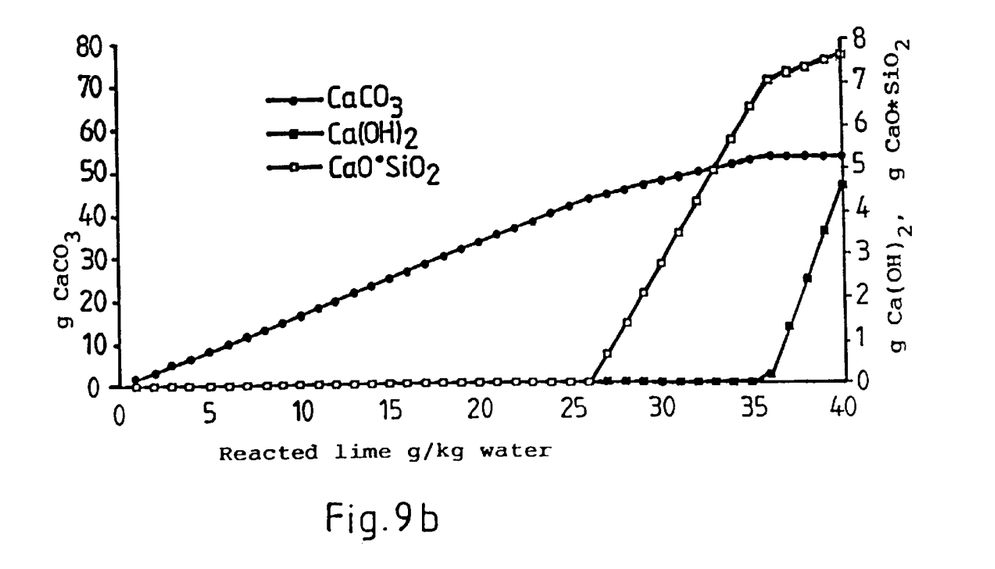

A simulation test which monitored proceeding of the causticizing process in green liquor by adding small amounts of lime in the solution, has been presented in FIG. 9. The composition of the initial solution (synthetic green liquor) was the following: 60 g $Na_2CO_3$/kg $H_2O$, 30 g NaOH/kg $H_2O$, 35 g $Na_2S$/kg $H_2O$, and 2 g $SiO_2$/kg $H_2O$. The lime supplied contained 92 weight per cent of CaO and 8 weight per cent of $SiO_2$. FIG. 9A indicates that at first the silicon content of the solutions increases when silicon dissolves from lime and reaches its maximum concentration 4 g $SiO_2$/kg $H_2O$ when about 26 g of lime has reacted. After this the silicon concentration of the solution begins to drop when silicon begins to precipitate as calcium hydrosilicate. FIG. 9B indicates that calcium hydrosilicate begins to precipitate when about 26 g lime/kg $H_2O$ has reacted. The (calculated) hydroxide and carbonate concentration of the solution is then 59 and 15 g/kg $H_2O$ calculated as NaOH and $Na_2CO_3$. Calcium hydroxide begins to precipitate when 35 g lime/kg $H_2O$ has reacted. The (calculated) hydroxide and carbonate concentration of the solution is then 70 and 5 g/kg $H^2O$ calculated as NaOH and $Na_2CO_3$.

Figure 10:
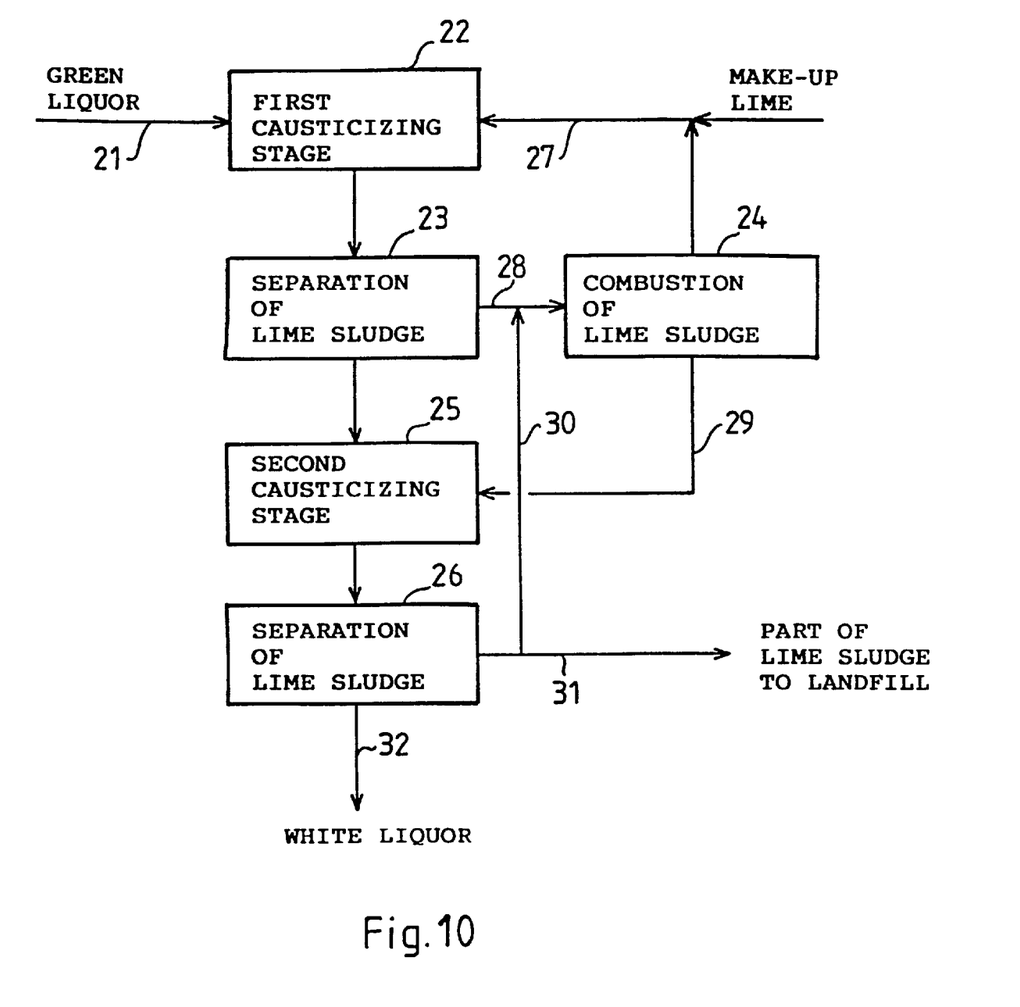
FIG. 10 illustrates an embodiment of the present invention in connection with causticizing.
Figure 11A:
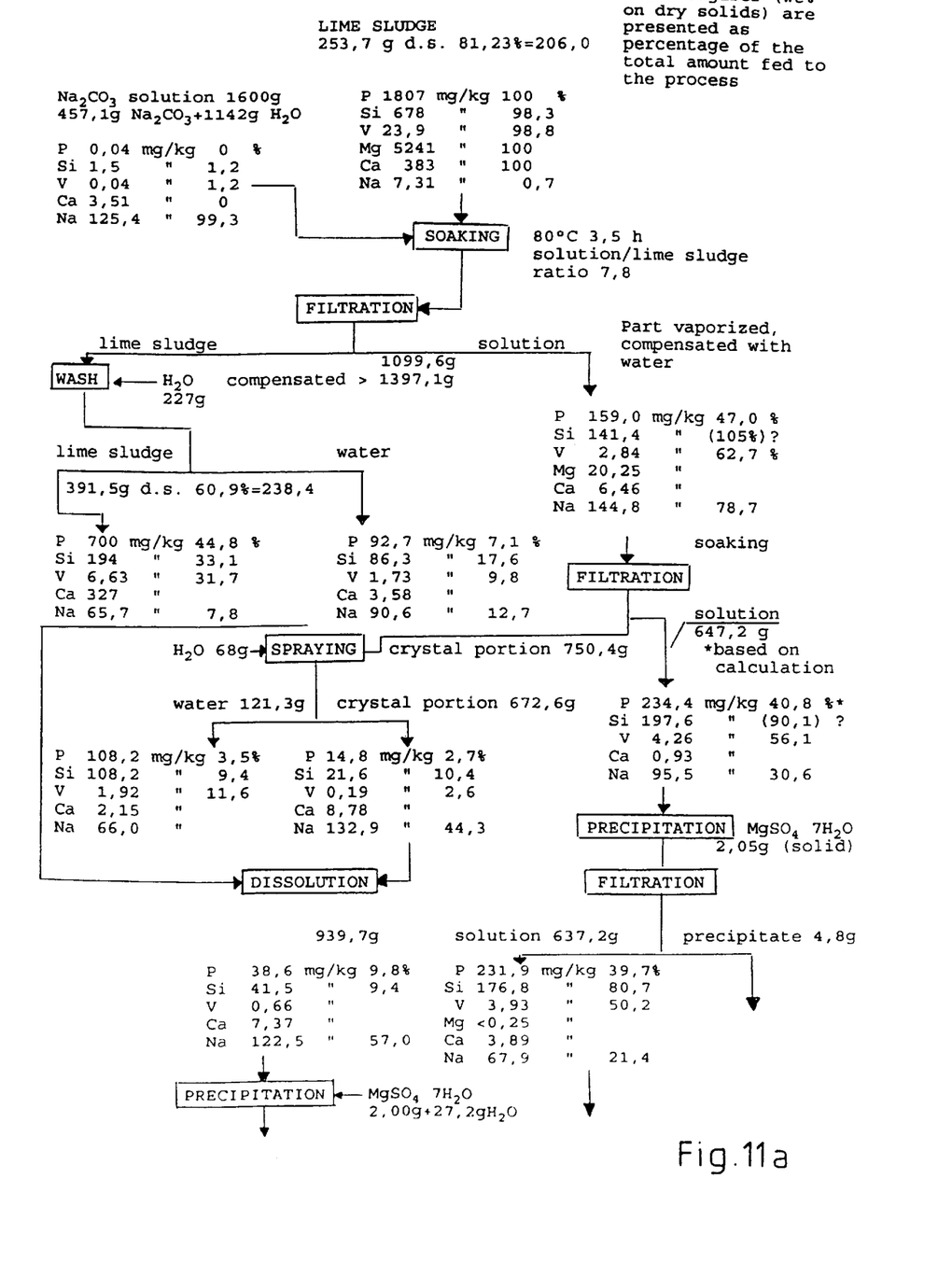
FIGS. 11a, 11b and 11c illustrate the flow sheet of a test utilizing the method of the invention.
Figure 11B:
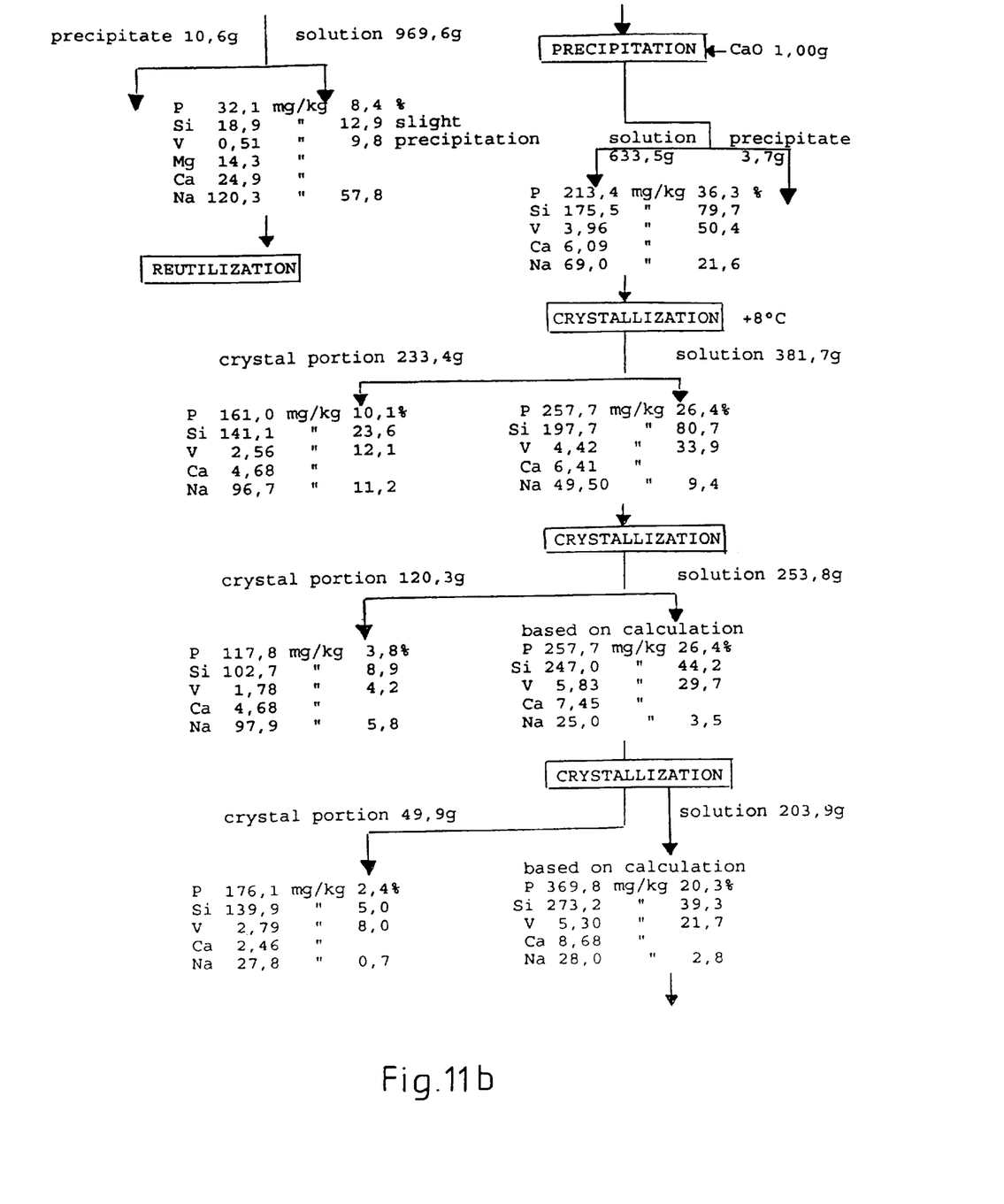
Figure 11C:
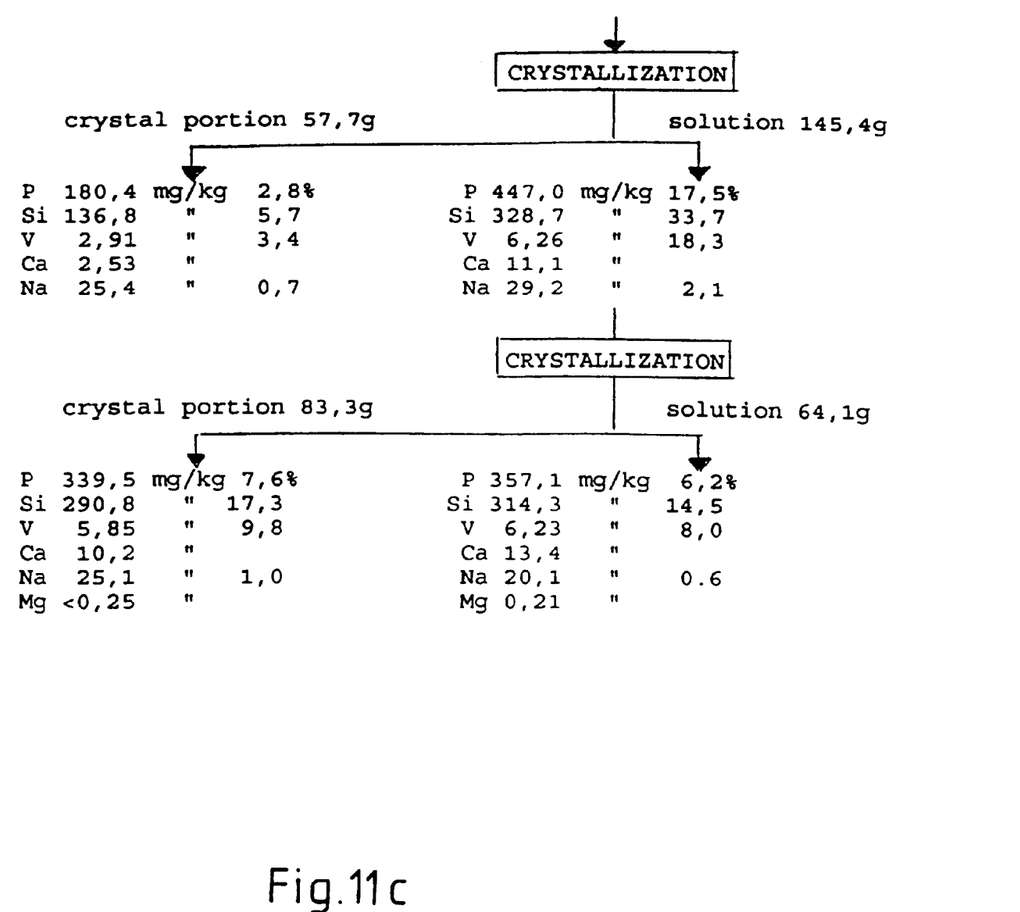

FIG. 10 illustrates applying the invention in two-staged causticizing. Green liquor is brought from the dissolving tank (not illustrated) of a soda recovery boiler in line 21 to the first causticizing stage 22. Preferably the green liquor has been manufactured so that its sodium hydroxide content is as low as possible, preferably less than 10 g/NaOH/kg. Preferably, the green liquor may also be pretreated in order to decrease its silicon content. Also lime via line 27 is brought to the causticizing 22 and silicon contained in the lime dissolves to the green liquor during the causticizing. In this way lime sludge is produced the silicon content of which is lower than that of the lime supplied to the causticizing process. Lime sludge is separated form the precausticized liquor in stage 23 and is brought in line 28 to combustion 4 for regeneration to lime.

Liquor is transported to the following causticizing stage 25 and the rest of the lime required for the causticizing process is added thereto via line 29. Then the amount of dissolved silicon in the solution and the amount of the added lime rise so high that silicon begins to precipitate and is concentrated in the lime sludge. Thus the silicon transferred in the first causticizing stage 22 to the solution precipitates in the lime sludge which is separated from white liquor in stage 26. A portion of the silicon-rich lime sludge may be removed from the process via line 31 to a landfill area or a corresponding place and thus the silicon load of the lime circulation may be controlled. The rest of the lime sludge may be taken via line 30 and further via line 28 with the lime sludge from the stage 23 to combustion 24. The removed lime sludge amount is replaced with make-up lime brought to the first causticizing stage 22. Make-up lime may be added also to the second stage 25 as a more reactive lime than the kiln lime.

The invention is not limited to the embodiments presented here as examples only but many modifications may be made of it within the scope of protection defined by the appended patent claims.

We claim:

1. A method of treating lime sludge or lime in connection with the chemical recovery system of a pulp mill, comprising:

(a) in a chemical recovery system of a pulp mill bringing lime sludge or lime having impurities therein into contact with a carbonate or hydrocarbonate liquid solution so that impurities in the lime or lime sludge dissolve in the solution;

(b) separating the lime sludge or lime from the solution, and the impurities dissolved in the solution;

(c) discharging the impurities from the pulp mill chemical recovery system; and (d) reusing the lime or lime sludge in the chemical recovery system.

2. A method as recited in claim 1 wherein the lime or lime sludge includes phosphor as an impurity; and wherein (a) and (b) are practiced to remove phosphor from the lime or lime sludge.

3. A method as recited in claim 2 wherein (b) is practiced by filtration, centrifugal separation, sedimentation, or combinations of filtration, centrifugal separation, or sedimentation.

4. A method as recited in claim 1 wherein lime sludge is treated in (a) and (b), and further comprising washing the lime sludge with water after (b) and before (d).

5. A method as recited in claim 4 further comprising balancing the water volume used for washing the lime sludge and the volume of liquid containing impurities discharged from the chemical recovery system so that the volume of water remains substantially constant.

6. A method as recited in claim 2 wherein (a) and (b) are practiced with lime sludge, and to remove at least about 98% of the phosphor in the lime sludge.

7. A method as recited in claim 1 wherein (c) is practiced by separating carbonate from the impurity-containing carbonate solution from (b) by crystallization so that the separated impurities concentrate in the liquid of the solution, discharging the liquid, and reusing the separated-out carbonate.

8. A method as recited in claim 7 wherein separation of the carbonate from the carbonate solution is practiced by cooling the solution.

9. A method as recited in claim 8 wherein cooling is practiced at a temperature between −2 and 30 degrees C.

10. A method as recited in claim 7 wherein separation of the carbonate from the carbonate solution is practiced by boiling the solution to effect evaporation of the liquid.

11. A method as recited in claim 7 wherein lime sludge is being treated; and wherein the separated-out carbonate is reused by dissolving it in water to obtain a solution, and (a) is practiced by using the solution containing the dissolved separated-out carbonate.

12. A method as recited in claim 7 wherein lime sludge is being treated; and wherein the separated-out carbonate is reused by dissolving it in water at a temperature of between about 20–80 degrees C.

13. A method as recited in claim 1 wherein (a) is practiced by soaking lime sludge in a carbonate solution for between 1.5–96 hours.

14. A method as recited in claim 1 wherein (a) is practiced with a carbonate-containing solution which includes at least one of $K_2CO_3$ and $(NH_4)_2CO_3$.

15. A method as recited in claim 1 wherein (a) is practiced using a saturated solution having a carbonate concentration between 10–400 g/l.

16. A method as recited in claim 1 wherein (a) is practiced by soaking lime sludge in a carbonate solution at a soaking temperature of between about 20 degrees C. and the boiling point of the carbonate solution.

17. A method as recited in claim 1 wherein (a) is practiced by soaking the lime or lime sludge between 1.5–96 hours using a sodium carbonate solution having a carbonate content of between 5–400 g/l.

18. A method as recited in claim 1 wherein (c) is practiced by removing the impurities from the solution by precipitating the impurities using lime.

19. A method as recited in claim 18 wherein (c) is practiced using a smaller volume of lime than the volume of lime or lime sludge treated in (a) and (b).

* * * * *